United States Patent [19]

Barten

[11] 4,088,930
[45] May 9, 1978

[54] COLOR TELEVISION DISPLAY DEVICE INCLUDING A CATHODE-RAY TUBE

[75] Inventor: Piet Gerard Joseph Barten, Eindhoven, Netherlands

[73] Assignee: U.S. Philips Corporation, New York, N.Y.

[21] Appl. No.: 447,564

[22] Filed: Mar. 4, 1974

Related U.S. Application Data

[63] Continuation of Ser. No. 367,944, Jun. 7, 1973, abandoned, which is a continuation of Ser. No. 52,640, Jul. 6, 1970, abandoned.

[30] Foreign Application Priority Data

Jul. 9, 1969 Netherlands .................. 6910495

[51] Int. Cl.$^2$ ............................................. H01J 29/56
[52] U.S. Cl. ...................................... 315/370; 335/213
[58] Field of Search .................. 315/13 C, 368, 370, 315/371; 335/213

[56] References Cited

U.S. PATENT DOCUMENTS 3,622,835 11/1971 Parker .................................. 315/371

Primary Examiner—Maynard R. Wilbur
Assistant Examiner—T. M. Blum
Attorney, Agent, or Firm—Frank R. Trifari; Henry I. Steckler

[57] ABSTRACT

A color televison display device including a cathode-ray tube whose neck supports a system of deflection coils which causes isotropic astigmatic errors upon deflection. This is eliminated with the aid of a quadripolar field to which end four windings are wound preferably as four toroid windings on the core of the deflection coil system at the area of the deflection plane. The windings are arranged pairwise opposite to each other and this in such a manner that two windings are exactly located in the gaps of the field deflection coils and the two other windings are shifted 90° in the tangential direction. Parabola currents which may have the line frequency and/or the field frequency must flow through the four windings. However, it is alternatively possible to replace the four windings by two each (thus a total of 8) in which a parabola current proportional to the line frequency flows through one pair of four windings and a parabola current proportional to the field frequency flows through the other pair of four windings.

15 Claims, 12 Drawing Figures

COLOR TELEVISION DISPLAY DEVICE INCLUDING A CATHODE-RAY TUBE

This is a continuation of application Ser. No. 367,944, filed June 7, 1973 now abandoned, which in turn is a continuation of application Ser. No. 52,640, filed July 6, 1970 now abandoned, which is based on Netherlands application No. 6,910,495, filed July 9, 1969. The priority of all of said cases is hereby claimed.

The invention relates to a colour television display device including a cathode-ray tube having a display screen and a system of deflection coils comprising a first and a second deflection coil unit, each unit having two symmetrical coil halves which are arranged opposite to each other, the first unit being shifted 90° in the tangential direction relative to the second unit, said system of deflection coils being slid around the neck of the cathode-ray tube for deflecting at least one electron beam generated in the cathode-ray tube into two orthogonal directions when the relevant deflection current flows through each coil unit.

The U.S. Pat. No. 3,440,483 describes a display device provided with means to correct the anistropic astigmatism. In case of anisotropic astigmatism substantially no errors in the picture formation occur along the axes of the display screen, that is to say, the horizontal and the vertical axis in the middle of the display screen which means that the system is substantially anastigmatic along the axes. On the other hand picture errors do occur along the diagonals and on either side thereof on the display screen which errors are greatest in its corners. To eliminate this astigmatism, which assumes inadmissible proportions especially in a 110° deflection colour display tube, said patent proposes to pass unequal currents through the two symmetrical coil halves of one of the two deflection units, the inequality being determined by a correction current which is the product of the instantaneous value of the two deflection currents.

This is an eminent solution. However, a drawback thereof is that a deflection coil system which is free from isotropic astigmatism is more difficult to manufacture than a deflection coil system which is free from anisotropic astigmatism.

A deflection coil system which is free from anisotropic astigmatism shows picture errors along the axes, but does not show substantially any picture errors on the diagonals. However, the difficulty to eliminate the picture errors along the axes is that there is no possibility of unequal control of the deflection currents in the two symmetrical coil halves of one of the two deflection coil units. In fact, errors along the diagonals are corrected with this kind of control, whereas exactly errors along the axes have to be corrected.

In order to be able to eliminate the errors along the axes for this isotropic astigmatism the display device according to the invention is characterized in that for the purpose of correcting the isotropic astigmatism the deflection coil system is furthermore provided with at least four windings which are provided tangentially relative to one another at an angle of approximately 90° and this in such a manner that two windings thereof, which are located opposite to each other, are situated near the two gaps between the symmetrical coil halves of one of the two deflection coil units, switching means being present to pass a correction current through the four windings, which current is dependent on a current which is mainly proportional to the square of the deflection current flowing through the first and/or on a current which is mainly proportional to the square of the current flowing through the second deflection coil unit so that the four windings generate a quadripolar field which is proportional to said currents at the area of the deflection plane of the electron beam.

The step according to the invention is based on two recognitions to be explained hereinafter.

(1) To obtain a satisfactory electron landing on the screen the correction is to be performed in the deflection plane itself. This argument particularly applies to a colour display tube of the shadow mask type.

(2) The correction is to be performed with a quadripolar field.

As will be described hereinafter, no interaction varying proportionally with the deflection occurs between correction and deflection fields when using a quadripolar field. This means that the operation of the correction field remains the same independent of the fact whether or not the deflection field is active.

Both above-mentioned requirements are satisfied with the aid of the four windings provided, according to the invention at the area of the deflection plane.

In order that the invention may be readily carried into effect, a few embodiments thereof will now be described in detail by way of example with reference to the accompanying diagrammatic drawings, in which.

Figure 6:
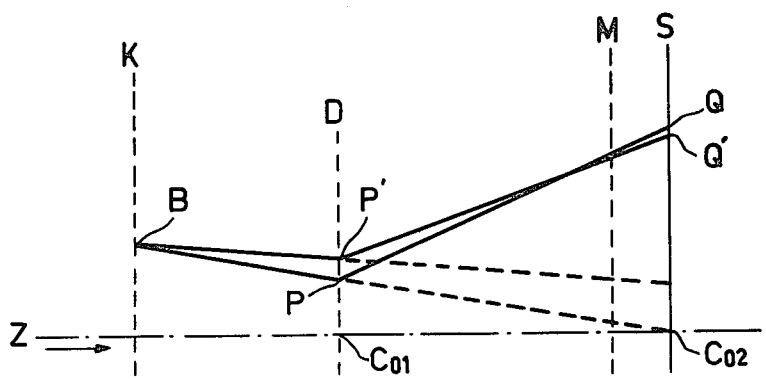

FIG. 6 serves to explain the fact that when the correction is not performed in the deflection plane itself, a mislanding of the electrons on the screen is the result thereof.

Figure 4:
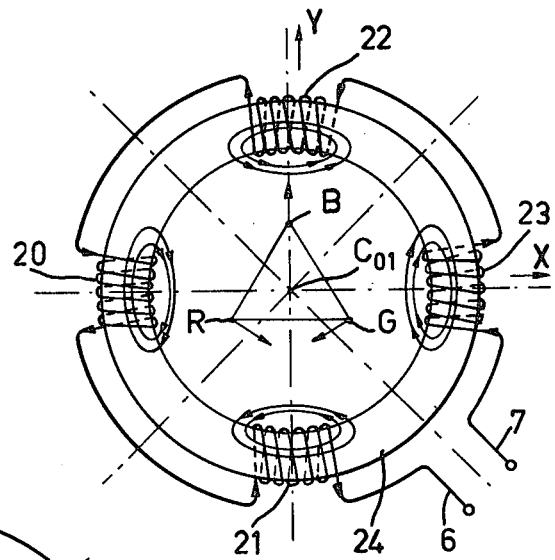
FIG. 4 is a simplified elevational front view of the system as is arranged on the neck of the cathode-ray tube, in which only the four toroid windings with their series connection and the position of the three beams on the vertices of an equilateral triangle are indicated at the area of the deflection plane in the neck of the cathode-ray tube.
Figure 7:
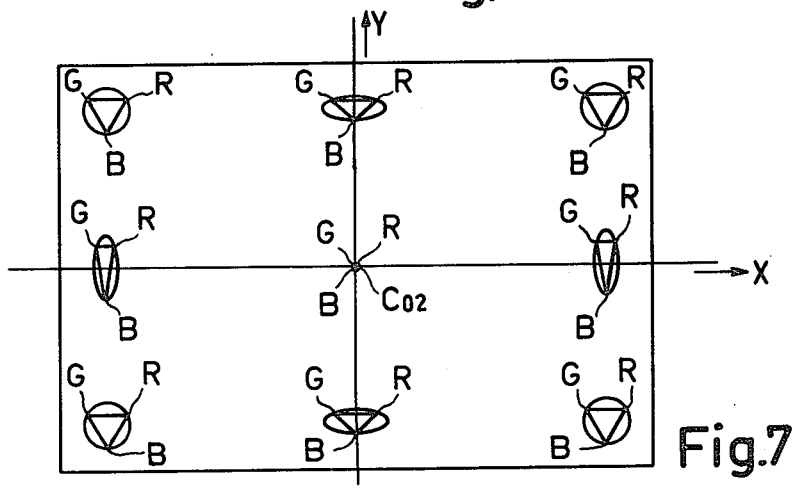

FIG. 7 shows the area of the screen S of a cathode-ray tube of the shadow mask type when the three sources of the electron beams are placed on the vertices of an equilateral triangle according to FIG. 4, and in which the picture errors occurring as a result of the isotropic astigmatism are shown.

Figure 8:
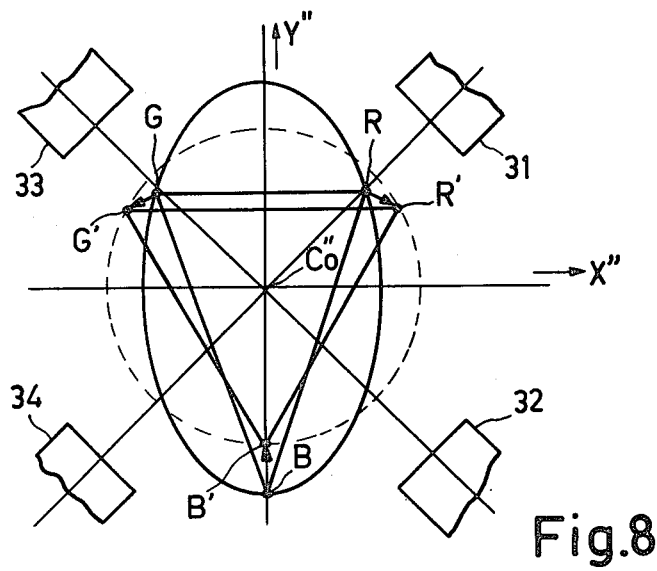

FIG. 8 illustrates the influence of the correcting quadripolar field along the x-axis for errors as shown in FIG. 7.

Figure 9:
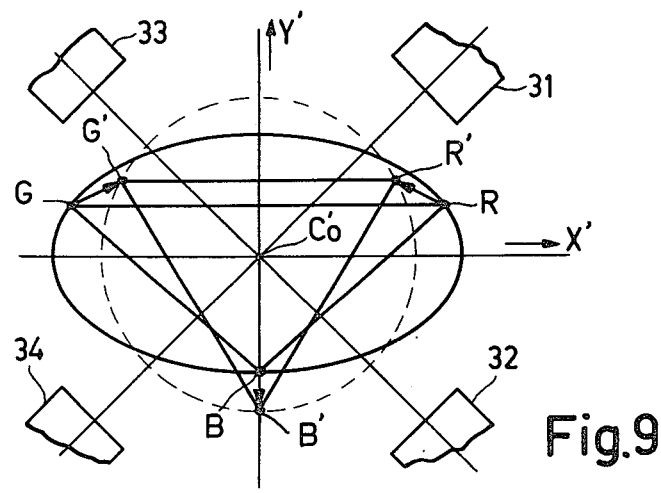

FIG. 9 illustrates the influence of this quadripolar field for the errors as shown in FIG. 7 along the y-axis.

Figure 5:
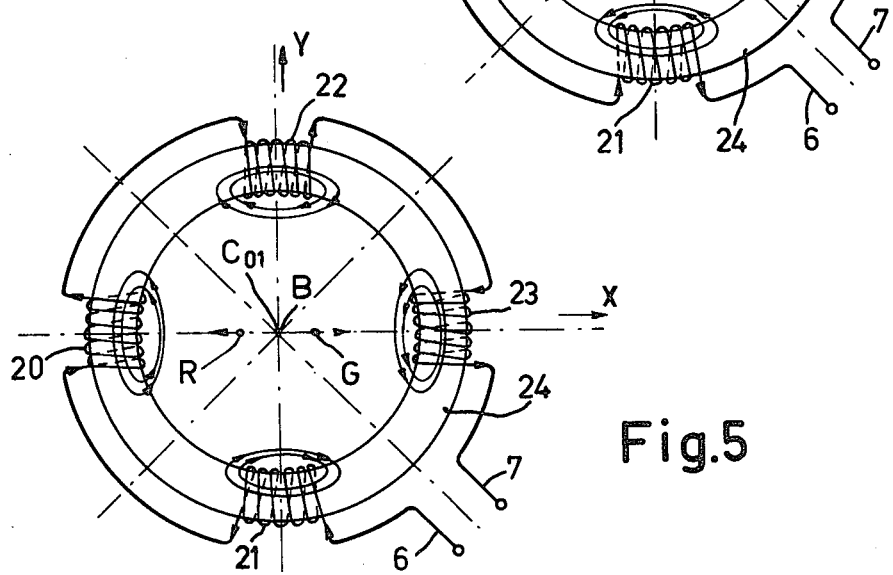
FIG. 5 shows the same elevational front view as that in FIG. 4 in which, however, the three beams are coplanar.
Figure 10:
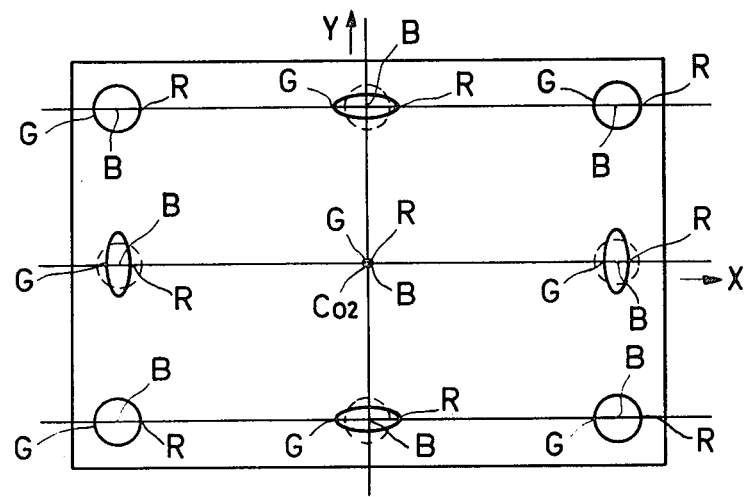

FIG. 10 shows the area of the screen S of the cathode-ray tube when the three electron sources are placed on one line as is shown in FIG. 5, and in which the occurring errors are shown.

Figure 11:
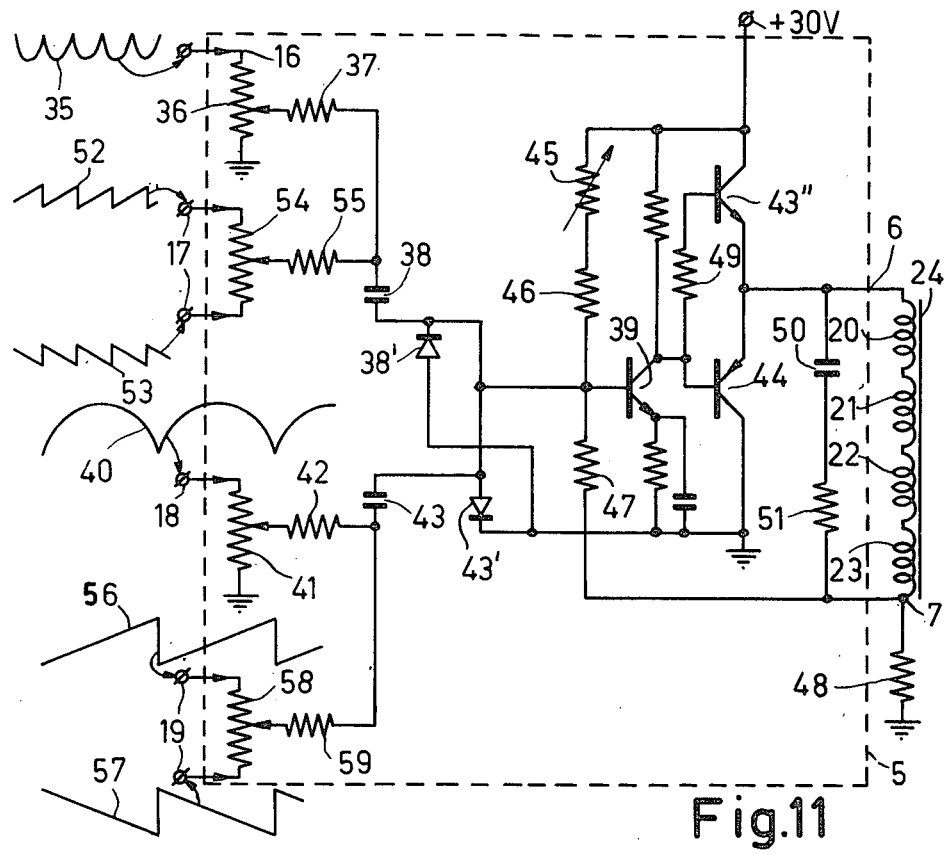
Figure 12:
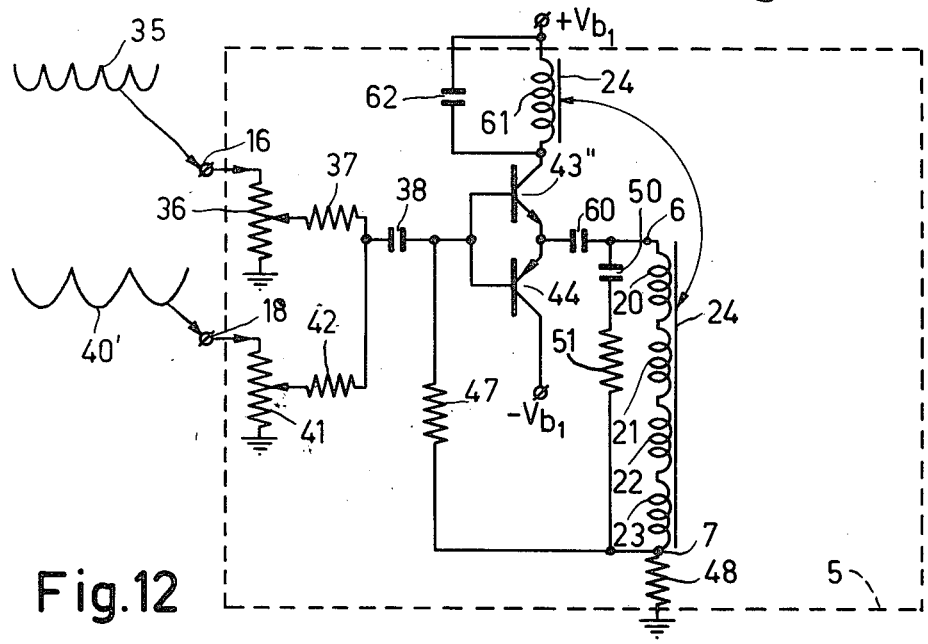

FIG. 11 is a detailed circuit arrangement for supplying the various currents to the four windings and FIG. 12 is a further detailed circuit arrangement when only parabolic currents are applied to the four windings.

It is to be noted that picture errors are understood to mean those deflection errors, which are referred to as astigmatism and coma. Predominantly important in this respect are the astigmatic errors since it has been attempted as much as possible in the design of the coils to eliminate the coma errors. In addition the present invention allows the designer of the deflection coil system more freedom because he may admit the astigmatic errors to a greater extent because these errors can be corrected with the aid of the quadripolar field.

Figure 1:
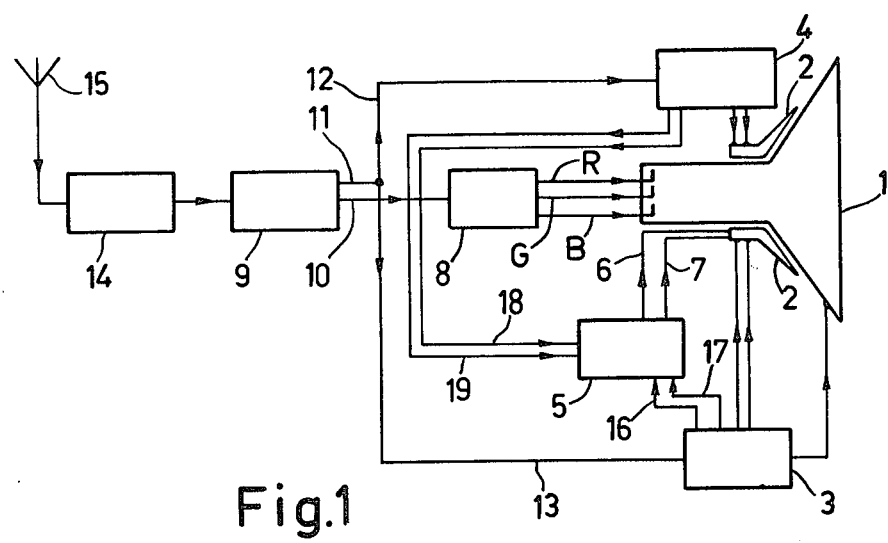
FIG. 1 shows a display device provided with a three-gun cathode-ray tube and switching means for sypplying the correction current through the four windings.

FIG. 1 shows a block diagram of a colour television display device including a three-gun display tube 1 of the shadow mask type. For convenience' sake it is assumed in this Figure that the cathode-ray tube is controlled on its three cathodes by the three chrominance signals red (R), green (G) and blue (B). However, it is alternatively possible to apply the luminance signal Y to these three cathodes and to apply the three chrominance signals to separate Wehnelt cylinders not shown in FIG. 1. The display tube 1 is provided with a deflection coil system 2 which is diagrammatically shown in FIG. 1 as two flaps but will be shown in greater detail in the following Figures. Sawtooth deflection currents of line frequency are applied to this deflection coil system 2 from a line generator 3 and the vertical deflection currents are applied from a generator 4. The EHT of approximately 25 kV, denoted in FIG. 1 by $V_{EHT}$, is also applied from the generator 3, which EHT provides for the final anode voltage of the cathode-ray tube 1.

As already stated in the preamble, the deflection coil system 2 may be of the isotropic astigmatic type which means that such a coil system is free from anisotropic astigmatism. This means that picture errors will occur along the axes of the display screen and to a certain extent beyond these axes and substantially no errors will occur along the diagonals of the system of axes. Alternatively, it is of course possible to eliminate the errors as a result of the anisotropic astigmatism in a different manner, for example, with the aid of the correction method described in said prior metioned U.S. patent. The still remaining errors as a result of the isotropic astigmatism may then be corrected with the aid of the quadripolar field generated by the windings which are provided in accordance with the present invention.

To be able to correct said errors correction currents must be applied to the four windings to be described hereinafter from switching means 5 through the lines 6 and 7. The nature of these correction currents will be further described hereinafter. In this respect it is only to be noted that these correction currents must be proportional to the square of the horizontal deflection current, in this case denoted by $x^2$ and/or the square of the vertical deflection current, in this case denoted by $y^2$. Particularly, when both the errors in the direction of the x-axis, which is the horizontal axis in the centre of the screen, and in the direction of the y-axis, which is the vertical axis on the centre of the screen, are to be eliminated and yet not to disturb the faultless deflection along the diagonals, the correction currents are to be chosen in accordance with the equation $$c_1 x^2 - c_2 y^2,$$

wherein $c_1$ and $c_2$ are constants which are to be chosen in such a manner that $$c_1 x^2 - c_2 y^2 = 0$$

in the vicinity of the diagonals, that is to say, the influences of the correction currents along the diagonals eliminate each other.

In the foregoing reference is made to a correction current which is proportional to the square of the horizontal and/or to the square of the vertical deflection current. In connection with non-linearities, either in the circuit arrangements used or as a result of the shape of the display screen, it may be necessary that this correction current is more proportional or less proportional to the said squares. Thus, it may be necessary under certain circumstances that also terms of, for example, $x^4$, $x^6$ and $y^4$, $y^6$, etc., are included in the correction current. In practice, this means that current waveforms are used which are not purely parabolic but slightly deviate therefrom.

FIG. 1 further shows the video amplifier 8 which supplies the three chrominance signals for the cathodes of the display tube 1, the intermediate frequency amplifier 9 incorporating detectors and amplifiers which apply the video signal to the line 10 from which the three chrominance signals can be derived and which apply the synchronizing signal to the line 11 which applies field synchronizing signals through the line 12 to generator 4, and the line synchronizing signals through the line 13 to generator 3. Furthermore, FIG. 1 shows the RF-amplifier 14, which receives colour television signals from the aerial 15. Finally a line 16 leads from generator 3 to generator 5 for supplying parabolic signals of line frequency to generator 5. These parabolic signals are therefore to be assumed as control signals for the ultimate supply of the correction current proportional to $x^2$ which is the square proportional to line or horizontal deflection current. Sawtooth signals of line frequency are applied through line 17 which, as will be further described with reference to FIG. 11, serve for possible correction of asymmetries in the horizontal deflection coil unit or of a slant arrangement of the guns in the tube 1.

Similarly parabolic signals of the frequency of the vertical deflection current are obtained from the vertical or field deflection generator 4 through the line 18. The last-mentioned parabolic signals are therefore responsible for the ultimate correction signal to be formed which is proportional to $y^2$ being proportional to the square of the vertical deflection current. Sawtooth signals of the vertical frequency are applied through the line 19 from the generator 4, which signals likewise serve to correct asymmetries, if any, in the vertical deflection coil unit or a slant arrangement of the guns.

In order to be able to perform the desired correction as a result of the isotropic astigmatism, four windings are included in the deflection coil system 2 in accordance with the principle of the invention. These four windings may be provided directly on the neck of the display tube 1, namely below the deflection coils so that the quadripolar field generated by these four windings is indeed active at the area of the deflection plane which is the area from which the deflection of the electron beams commences. These four windings may be provided on the neck pairwise facing each other and shifted 90° in the tangential direction relative to each other. However, it is better to work with four toroid windings 20, 21, 22 and 23 as is shown in FIGS. 2, 3, 4 and 5 which coils are wound on a core 24 associated with the deflection coil system. In that case these four toroid windings are to be provided in such a manner that they are located pairwise facing each other and are shifted 90° relative to each other in the tangential direction. In addition they must be located in a certain manner relative to the deflection directions $x$ and $y$ so that the axes of the quadripolar field which is generated by the four toroid windings coincide with the diagonals of these $x$ and $y$ directions. This is shown in FIGS. 4 and 5 in which both the $x$- and $y$ axes and the diagonals positioned at an angle of 45° relative thereto are shown. In this case it is to be noted that the $x$-$y$ system of axes of FIGS. 4 and 5 is assumed to be in the deflection plane D, while the $x$-system of axes of FIGS. 7 and 10 is assumed to be at the area of the screen S.

Figure 2:
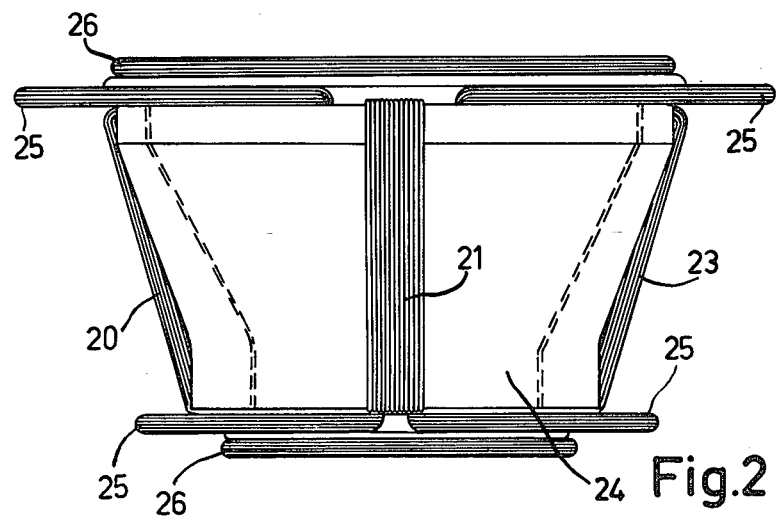
FIG. 2 is an elevational side view of a deflection coil system according to the invention in which the four windings are provided as toroid windings on the core of the deflection coil system itself.
Figure 3:
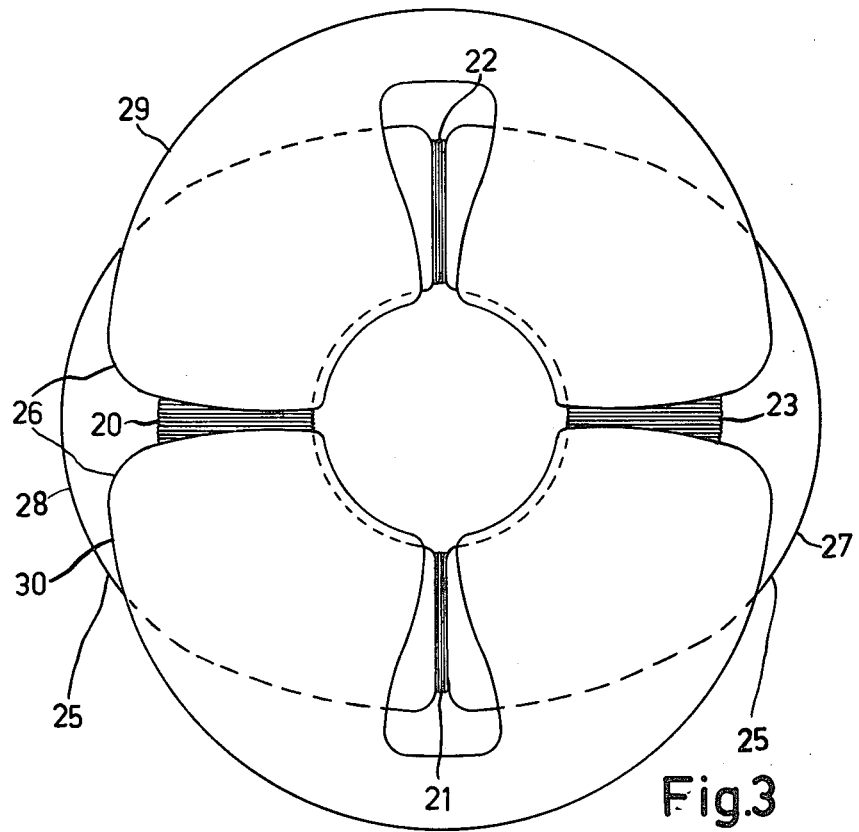
FIG. 3 is an elevational front view of the deflection coil system according to FIG. 2.

Said locations may be obtained by winding the windings 21 and 22 at the area of the gaps between the two coil halves of the vertical deflection coil unit 25 and by winding the windings 20 and 23 opposite to each other at the area of the windows of the two coil halves of the vertical deflection coils 25 around the core 24. This means that the windings 21 and 22 are located at the area of the windows of the two coil halves of the horizontal deflection unit 26 and that the windings 20 and 23 are located at the area of the gaps between the two coil halves of this horizontal deflection unit 26. Furthermore, FIGS. 2 and 3 show that each deflection coil unit consists of two deflection coil halves, to wit the vertical deflection unit 25 consists of a deflection coil half 27 and a deflection coil half 28 while the horizontal deflection unit 26 consists of a first deflection coil half 29 and a second deflection coil half 30. It is to be noted that although only four windings 20 to 23 are mentioned above, each of the four windings may alternatively be replaced by two windings (that is to say, winding 20 may be replaced by two windings, winding 21 may be replaced by two windings, etc.) so that an overall number of 2 pairs of windings each constituting four windings is obtained. A current proportional to the line frequency is then to flow through one pair while a current proportional to the field frequency is to flow through the other pair.

The deflection coil units themselves receive their sawtooth currents from the generators 3 and 4, respectively, and will not be further referred to because they operate in known manner.

The four toroid windings are arranged in series in the Examples according to FIGS. 4, 5 and 11, so that the desired correction currents can be applied from the generator 5 to their ends 6 and 7. However, it will be evident that these coils may alternatively be arranged in parallel or pairwise in series and each further pair in parallel. The choice thereof will depend on the number of turns for each toroid winding and therefore the current required in various cases.

FIGS. 4 and 5 show magnetic lines of force which are generated by the field of the four toroid windings 20 to 23 if a current flowing in a certain direction flows through these windings. The arrows in these lines of force show clearly that a quadripolar field is used whose axes constitute the diagonals of the $x$-$y$ axis system. FIGS. 4 and 5 also show by way of the characters R, G and B the positions of the red (R), the green (G) and the blue (B) electron beams, respectively. Since in FIGS. 4 and 5 this is assumed to be at the area of the deflection plane D, the points R, G and B should be considered as fictitious points, since actually the electron beams are deflected by the action of the deflection field. In that case the deflection takes place gradually over a certain distance. Actually, it is therefore not possible to speak of a deflection plane. For the sake of simplicity, reference is always made to a deflection plane D in this respect because this does not detract from the nature of the description. In the Example of FIG. 4, the three beams are considered to be situated on vertices of an equilateral triangle, while in the Example of FIG. 5 they are considered to be situated in a plane which passes through the $x$-axis and the axis of tube 1. In the case of FIG. 4, forces on the electron beams R, G an B are exerted by the quadripolar field which forces are denoted by the arrows at each of the points R, G and B. It will be explained with reference to FIGS. 8 and 9 how these forces cause the desired correction to take place. The direction of the arrows as shown in FIG. 4 then corresponds to a correction as will be described with reference to FIG. 8, which correction applies for the $x$-direction on the screen. In that case the current which then flows through lines 6 and 7 may be considered as a positive current proportional to $x^2$. For the correction required along the $y$-axis as will be described with reference to FIG. 9, the forces should reverse their direction. This is evident from the arrows shown in FIG. 9 at the points R, G and B. Consequently, the current then flowing through the lines 6 and 7 must be proportional to $-y^2$ which in the foregoing is expressed by the formula $c_1 x^2 - c_2 y^2$. Thus FIG. 4 corresponds to FIG. 8 and FIG. 9 corresponds to a quadripolar field according to FIG. 4 in which the current which is applied through the lines 6 and 7 is of opposite sign and consequently the arrows shown in the magnetic lines of force and the forces caused thereby at the points R, G and B denoted by the arrows shown at said points must all be reversed in their direction. Furthermore FIGS. 8 and 9 diagrammatically show the quadripolar fields by means of four magnetic poles 31, 32, 33 and 34 which are shown at the ends of the diagonals and which symbolize the action of the quadripolar field at the area of the screen S. However, it is to be noted that this quadripolar field at the area of the deflection field is generated by the four toroid windings 21 to 23 and is therefore actually active in that area.

Furthermore it is to be stated that in FIG. 4 the positions of the beams R and G are located on the lower side of the $x$-axis while the positions of the beams R', G' and R and G in FIGS. 8 and 9 are located above the $x''$ and $x'$ axes, respectively. This results from the fact that reversal takes place at deflection because the beams cross each other before they impinge upon the screen so that the situation at the area of the screen S is reversed relative to the situation at the area of the deflection plane D. These points of intersection are substantially located on a sphere whose radius of curvature is determined by the picture field curvature of the deflection coil system 2. However, since the action of force by the quadripolar field is effected at the area of the deflection plane D, the direction of the arrows as shown in FIG. 4, associated with each of the points R, G and B, must be the same as those in FIG. 8 for the corresponding points. Consequently, the electron beams are indeed displaced in a manner as is shown in FIG. 8, if this Figure corresponds to FIG. 4. The same applies of course to FIG. 9 if the current direction in FIG. 4 is reversed.

Furthermore, it is to be noted that a centre $C_0$ is shown in FIGS. 4, 5, 7 and 10, which centre corresponds to the axis $z$ of the display tube 1. It is true that the FIGS. 4 and 5 are assumed to be in the deflection plane D and FIGS. 7 and 10 are assumed to be at the area of the screen S, but since the axis z passes both through the centre $C_{01}$ of the deflection plane D and the centre $C_{02}$ of the screen S, these centres may be considered to be corresponding. Centres $C_0''$ and $C_0'$ in FIGS. 8 and 9 must, however, be considered as transformed centres, because FIGS. 8 and 9 apply to a deflected position on the screen S in the direction of the x-axis and the direction of the y-axis, respectively.

A consideration of FIGS. 7 and 8 shows that the desired correction can be obtained with the aid of the generated quadripolar field. In fact, in FIG. 7 the error along the x and y-axes is indicated for a display device in which the deflection coil system 2 exclusively has an isotropic astigmatic error. It can be seen that the desired circular form for which the three electron beams at the area of the screen S are always located on the vertices of an equilateral triangle is distorted along the axes and remains intact along the diagonals. Thus, the vertices of FIG. 7 include four circles from which it is clearly evident that the electron beams R, G and B at the area of the screen S remain located on the vertices of an equilateral triangle in spite of the deflection. This means that the dynamic radial convergence which is established in known manner by means of a separate Convergence unit with convergence currents, which have substantially the same amplitude for each of the three beams can combine the three beams in one point so that they actually cross one another at the area of the screen S.

FIG. 7 shows that as a result of the isotropic astigmatism along the x-axis the circle is extended to form an ellipse, the long axis of the ellipse being located in the y-direction which corresponds to FIG. 8. This is exactly reversed along the y-axis and then likewise the circle is extended to form an ellipse the long axis of which is, however, located in the x-direction which corresponds to FIG. 9. As already described hereinbefore, FIG. 8 corresponds to a correction in the x-direction and this correction is performed with the aid of quadripolar fields which are proportional to $x^2$ being the square of the horizontal deflection current. In fact, this horizontal deflection current increases in the horizontal direction on either side of the y-axis passing through the centre $C_{02}$. Since the errors on the left and right-hand sides of this y-axis are the same, it follows that a current must be passed through the four windings 20 to 23 which current is mainly proportional to the square of the horizontal deflection current, that is to say, proportional to $x^2$. FIG. 8 shows that the points R, G and B on the ellipse are displaced along the arrows as a result of the action of force in the quadripolar field to the points R', G' and B', respectively, which are located on a circle. Due to the normally active dynamic convergence the electron beams brought to the points R', G' and B' may then be combined in the centre $C_0$, at substantially the same convergence currents, so that a satisfactory colour display is ensured. It will be evident that the desired correction is obtained because the correction current is proportional to the square of the horizontal deflection current at any point of the screen on either side of the y-axis. As will be further described with reference to FIG. 11, the extreme value of the parabolic current of line frequency used for this purpose must then be set at a zero value in the middle of the line scan period, because no correction proportional to $x^2$ is required for this middle. This means that the extreme value of the parabola must be clamped at a zero level, or, when adaptation to the static convergence in the centre $C_{02}$ is desired, to an adapted level.

The same applies to FIG. 9 because in this Figure the ellipse with its long axis is located in the x-direction and therefore FIG. 9 corresponds to the errors which occur along the y-axis in the vertical direction. Since the errors above and below the x-axis are the same, this explain the necessity to have the correction current to be proportional to $y^2$. Also in this case the correction will proceed smoothly when a parabolic current of field frequency is used whose extreme value is set to a zero value in the middle of the field scan period, or to a level adapted to the static convergence. Then again it is ensured that the desired correction is performed for any point on the display screen above and below the x-axis because the correction current is proportional to the square of the vertical deflection current. It follows from FIG. 9 that the points R, G and B located on an ellipse are displayed along the arrows to the points R', G' and B' due to the action of force of the quadripolar field, which points are again located on a circle and which can be centered in the centre $C_0'$ due to the normally active dynamic convergence. This again ensures that the three electron beams can be combined at substantially the same convergence currents at any point of the screen.

The aforementioned choice of $C_1x^2 - C_2y^2 = 0$ on the diagonals ensures that the situation on the diagonals is not disturbed by the correction. Said choice of $C_1x^2 - C_1y^2 = 0$ on the diagonals is, however, only necessary when both the isotropic astigmatism on the x-axis and that on the y-axis are to be eliminated. On the other hand, if, for example, for the indexing tube or the three-gun chromatron tube the errors as a result of the isotropic astigmatism are to be eliminated only on the x-axis or only on the y-axis, then it is sufficient to pass through the four toroid windings only a current which is proportional to $x^2$ or only a current which is proportional to $y^2$.

It has already been stated in the preamble that the action of the correcting quadripolar field must take place in the deflection plane D. The reason for this will be described with reference to FIG. 6. This Figure diagrammatically illustrates a cross-section through the display tube 1 in which the plane K denotes the plane where the cathodes of the display tube 1 are situated, the plane D denotes the deflection plane at the area of the deflection coil system 2, M denotes the position of the mask and S denotes the position of the screen on which the phosphors have been provided. Furthermore the z-axis in FIG. 6 indicates the axis of the display tube and the point $C_{01}$ corresponds to the centre $C_{01}$ in FIG. 4 and FIG. 5, respectively, and the centre $C_{02}$ corresponds to the centre $C_{02}$ in FIGS. 7 and 10, respectively. FIG. 6 furthermore only shows one electron beam, for example, the blue (B) beam which emanates from the plane K and which normally passes through the point P so as to pass through the point $C_{02}$ at the area of the screen S which point is the point of intersection of the screen S and the axis z of the display tube 1. If the electron beam were deflected in the plane D from the point P, it would meet at point Q on the screen S which point Q is the correct point because this corresponds to the blue phosphor dot which is provided on this spot on the screen S. However, the foregoing shows that a correction field is necessary to eliminate the error due to isotropic astigmatism and picture field curvature. If this correction as seen in the direction of displacement of the electrons were performed before the deflection plane D, then this means that the electron beam, starting from the point B in the plane K undergoes a displacement in advance so that it would not pass the deflection plane D at the point P, but at the point P' and would undergo a deflection in situ, so that ultimately this electron beam impinges upon the screen S at the point Q'. However, since the points Q and Q' on the screen S do not coincide, this means that there is actually a mislanding of the electrons on the screen S. In fact the landing is displaced and consequently this may result in a less saturated colour or a faulty colour rendition, since only a correct landing in the point Q on the blue phosphor dot provided in situ ensures a saturated and faultless colour rendition. This can be achieved by performing the required correction not before the deflection plane but in the deflection plane and this in such a manner that the deflection point remains the point P, but that the deflection of the electron is corrected by the quadripolar field. It is then achieved that a correct landing of the electrons on the screen S is ensured under all circumstances. Consequently, the quadripolar field produced by the four toroid windings should engage the deflection plane D. By winding in accordance with the principle of the invention the four toroid windings on the core 24 this condition is satisfied and it has been achieved that the plane of the re-adjustment of the electron beams coincides or at least approximately coincides with the deflection plane D of the deflection coil system 2, so that the landing on the screen S is not influenced. It may be noted that the normal dynamic convergence which is still required displaces the electron beams before they reach the deflection plane D, but this displacement does not result in a mislanding. The reason is that it is ensured with the aid of the principle according to the invention that the three convergence currents for the separate convergence unit have the same mutual amplitude for any point on the screen. It is true that a displacement in the landing spot is obtained (because the separate convergence unit is active between the planed K and D) but this may be adapted by a varied screen mask distance. For the described correction with the quadripolar field the displacement of the three beams R, G and B is, however, unequal. In summary it may therefore be stated that: the required displacement is split up into (a) a part which is mutually equal for the three beams and which is formed with the aid of the separate convergence unit which, as is known, is active between the plane of the cathodes K and the deflection plane D; and (b) a part which is mutually unequal for the three beams and which is formed with the aid of the quadripolar field active in the deflection plane D.

The four windings are always indicated hereinbefore as four toroid windings wound on the core 24. However, it is alternatively possible to adhere the four windings separately on the neck of the tube under the deflection coil system 2. Then the adjustment is, however, much more critical because the position of these four windings must exactly be determined in advance relative to the deflection coil system 2 to be provided later on. In addition there must be a possibility of shifting the deflection coil system 2 somewhat in the axial direction so as to be able to adjust the correct position of the deflection coil system 2. Winding on the core is therefore preferred because upon shifting the windings 20 to 23 are also shifted.

Although the Example of FIG. 1 always described a three-beam cathode-ray tube of the shadow mask type, it will be evident that the principle of the invention is not limited to this kind of tube along. Thus, it is alternatively possible to use a three-beam display tube of the chromatron type in which the electron beams are located in a plane passing through the x-axis and through the axis of the tube 1. (See FIG. 5). The same is alternatively possible for a three-beam display tube of the shadow mask type. In that case errors as shown in FIG. 10 will likewise occur as a result of isotropic astigmatism. This means that the electron beam B always remains in the deflection centre or either side of the x-axis, but that the beams R and G are further moved away from this centre. By generating a field of force as shown in FIG. 5 the beams G and R are displaced in accordance with the arrows shown in this Figure. This means that the beam G is displaced to the right-hand side as a result of the quadripolar field and the beam R is displaced to the left-hand side. These displacements are necessary to eliminate the errors in either side of the x-axis. Consequently the quadripolar field according to FIG. 5 is produced by a current which is proportional to the square of the vertical deflection current, that is to say, proportional to $y^2$.

Unlike the Examples described with reference to FIGS. 4 and 7, there is now the possibility to make the three beams R, G and B completely coincide without a separate dynamic convergence unit. In fact, as FIG. 10 shows, the blue beam B on either side of the y-axis is not displaced from the new deflection centre so that also when the same forces are exerted by the quadripolar field on the beams G and R, these beams can be made to coincide with the beam B at the area of the screen S. It follows that also the quadripolar field which is active in the x-direction must be proportionally to $x^2$ which means that it must be generated with the aid of a parabolic current of line frequency.

The same applies to the diagonals. In fact, also in that case beam B always remains in the deflection centre, but the beams G and R are located on either side thereof (see the circles in the vertices of the screen S in FIG. 10). Also in this case a force on beam G to the right-hand side and a force on beam R to the left-hand side may ensure that these two beams are made to coincide with the beam B.

However, the required field of force in the direction of the x-axis is the smallest, it is larger along the diagonals and it is the largest on the direction of the y-axis. If it is assumed that everything on the screen S were located on a circle, the required current for the four windings 20 to 23 would have to be proportional to $c_1 x^2 + c_2 y^2$.

However, the correction in the x-direction may be smaller than for the case of the circle because the beams G and R have already been displaced somewhat to the centre as a result of the isotropic astigmatic error. As a result the correction current is to be reduced by a factor of $c_3 x^2$ relative to the case of the pure circle.

However, in the y-direction the action of the quadripolar field must be stronger because the beams G and R are then farther away from the beam B. Consequently the correction current is to be increased by a factor of $c_4 y^2$.

Consequently an overall correction current is obtained which is determined by $$c_1 x^2 + c_2 y^2 - c_3 x^2 + c_4 y^2$$

In that case there must apply that $$c_4 y^2 - c_3 x^2 = 0$$

on the diagonals, since exclusively the correction relative to the case of the circle must be performed for these diagonals.

The last equation may be written as $$(c_1 - c_3)x^2 + (c_2 + c_4)y^2$$

which equation with $$(c_1 - c_3) = c_1' \text{ and } (c_2 + c_4) = c_2'$$

changes into $$c_1' x^2 + c_2' y^2$$

and in which $$c_1' = c_1 - c_3 \geq 0$$

(The zero case applies when the isotropic astigmatic error ensures that the beams R, G and B already coincide in the x-direction).

In the case of FIG. 10 this means that as a rule the overall correction current must consist of the sum of a parabolic current of line frequency and a parabolic current of field frequency. The circuit arrangement which is required for generating these currents is shown in FIG. 12 and will be described hereinafter.

It will be evident that the principle described in FIG. 10 is alternatively usable for a colour display tube of the indexing type. In fact, in such tubes the spot may not extend in a horizontal direction because this would lead to the display of unsaturated colours in an indexing tube in which the colour strips are arranged vertically on the screen. A quadripolar field according to the invention may then ensure that the sagittal picture plane for one deflection direction and the meridional picture plane for the other deflection direction coincide with the screen of the tube. Due to this additional degree of freedom in the design of the coils it is possible to start from a deflection coil having smaller residual errors.

The fact that the action of the quadripolar field on the beams is independent of the deflection performed is proved as follows:

From Maxwell's second law there follows that $$\text{div } \bar{B} = 0 \qquad (1)$$

wherein B is the vectorial representation of the magnetic induction.

Equation (1) may be written as $$\delta B_x/\delta_x + \delta B_y/\delta_y + \delta B_z/\delta_z = 0 \qquad (2)$$

if a three-dimensional field is supposed calculated relative to a system of axes x, y, z.

Since for the correction field a flat plane D is always used, a system of axes x, y is left as is shown in FIGS. 4 and 5. For such a flat plane $$\delta B_z/\delta_z = 0$$

which causes equation (2) to change into $$\delta B_x/\delta_x + \delta B_y/\delta_y = 0 \qquad (3)$$

For the calculation to be further performed it is simpler to change into polar coordinates $r$ and $\psi$ for which there applies that $$r = \sqrt{x^2 + y^2} \text{ and } tg\ \psi = x/y$$

In this formula $\psi$ is the angle located between the radius $r$ and the y-axis. When furthermore the solution for the field strengths $B_x$ and $B_y$ in pole coordinates is given by some approximation in a field of n-poles by $$B_x = f_{(r)} \cdot \sin(1 - n/2)\psi \qquad (4)$$

and $$B_y = f_{(r)} \cdot \cos(1 - n/2)\psi \qquad (5)$$

then after the change-over into pole coordinates with the aid of (3) it is found that $$\delta B_x/\delta_x + \delta B_y/\delta_y = \cos n\psi/2 \ \{f'_{(r)} + (1-n/2) f_{(r)}/r\} = 0 \qquad (6)$$

with $$f'_{(r)} = [df(r)/dr]$$

From this follows:

$$f'_{(r)} = (n/2 - 1)\ [f_{(r)}/r]$$

with the solution $$f_{(r)} = A \cdot r^{(n/2 - 1)} \qquad (7)$$

wherein A is the integration constant.

Filling in equation (7) in the equations (4) and (5) results in $$B_x = A r^{(n/2 - 1)} \sin(1 - n/2)\psi \qquad (8)$$

$$B_y = A r^{(n/2 - 1)} \cos(1 - n/2)\psi \qquad (9)$$

The values of the field strength B may be assumed to be a vector by expressing it in a complex plane as $$\bar{B} = B_y + iB_x = A r^{(n/2 - 1)} e^{i(1-n/2)\psi} = A(r \cdot e^{-i\psi})^{(n/2 - 1)} \qquad (10)$$

It can be deduced from equation (10) that the chosen solutions in accordance with the equations (4) and (5) are correct. In fact, for $n = 2$, that is, for a bipolar field equation 10 changes to $$B = A \qquad (10')$$

This means that the field strength is constant and real which is correct, if the dispersion losses are ignored a field can be seen in the y-direction (being the real axis) which has the same intensity throughout independent of the coordinates $r$ and $\psi$ and $x$ and $y$, respectively.

In order to check the influence of the deflection for these multipolar fields to a complex auxiliary magnitude $\bar{v}$ is introduced so as to simplify equation (10) which magnitude may be expressed in the coordinates $x$ and $y$ in accordance with $$\bar{v} = y - ix.$$

If the latter equation is written in polar coordinates it changes into $$\overline{V} = r\cos\psi - r.i.\sin\psi = re^{-i\psi}$$

Filling in equation (11) in equation (10) the result is $$\overline{B} = A(\overline{v})^{(n/2-1)} \quad (12)$$

In case of deflection the influence of the field must be checked in accordance with equation (12) which may be effected by assuming that a transformation equation $$\overline{v}' = \overline{v} - \overline{v}_o \quad (13)$$

can be set up after deflection to a point $\overline{v}_o$ which expresses the value of a new complex magnitude $\overline{v}'$ relative to the new origin $\overline{v}_o$.

Introducing the transformation equation (13) into equation (12) yields $$\overline{B} = A(\overline{v}' + \overline{v}_o)^{(n/2-1)} \quad (14)$$

The influence of the multipolar field can now be checked with the aid of equation (14) for different values of $n$. For a quadripolar field $n = 4$ and equation 14 changes into $$\overline{B} = A(\overline{v}' + \overline{v}_o) \quad (15)$$

Both $A\overline{v}'$ and $A\overline{v}_o$ may be considered as a pure quadripolar field. In fact, the factor $n/2 - 1$ which determines the nature of the field changes for $n = 4$ into $n/2 - 1 = 1$, that is to say, a quadripolar field is expressed by a power 1. Since in equation (15) both $\overline{v}'$ and $\overline{v}_o$ have the power 1 they may both be considered as a quadripolar field. The term $A\overline{v}_o$ represents a homogeneous field which exerts the same action on the three beams in magnitude and direction. The term $A\overline{v}'$ represents a quadripolar field which as regard its effect on the three beams is equal to the original quadripolar field $A\overline{v}$. This may alternatively be expressed by stating that $\overline{v}_o$ may be considered as a new centre of a correcting quadripolar field $\overline{v}$ which varies proportionally with the deflection.

However, if a hexapolar field were chosen as a correction field, then $n$ would have become 6. Introducing this in equation (14) results in $$\overline{B} = A(\overline{v}' + \overline{v}_o)^2 = A(\overline{v}'^2 + \overline{v}_o^2 + 2\overline{v}'\overline{v}_o) \quad (16)$$

The factor $n/2 - 1$ changes into 2, that is to say, a hexapolar field is expressed by a power 2. Consequently it is found from equation (16) that in addition to the active hexapolar field $A\overline{v}'^2$ and the homogenous field $A\overline{v}_o^2$, wherein $v_o$ may be considered as a new centre for the correcting field, a quadripolar field $2A\overline{v}'\overline{v}_o$ is produced which is influenced in amplitude and direction by the new centre $\overline{v}_o$ because, in fact, it occurs as a product term together with $\overline{v}_o$ in equation (16). From this follows that interaction takes place between correcting hexapolar field and deflection field. A similar reasoning as for a hexapolar field etc. may be maintained for the octapolar field (fill in $n = 8$ in equation 14) so that this proves that only an additional quadripolar field can be used for the correction of isotropic astigmatism to be described.

FIG. 11 shows a possible embodiment of the generator 5 according to FIG. 1 for generating currents for correcting errors as described with reference to FIGS. 4 and 7. A possible signal 35 of line frequency is applied to the input terminal 16 of the generator 5, which parabola is thus proportional to the square of the horizontal deflection current, that is to say, it is proportional to $x^2$. This signal 35 is applied to a potentiometer 36 whose wiper is connected through a resistor 37 and a capacitor 38 of high value for the line frequency to a base electrode of a first amplifier 39. At the other end a parabola signal 40 of the vertical frequency is applied to an input terminal 18, whose signal is therefore proportional to $y^2$, that is to say, to the square of the vertical deflection current. This signal is applied to a potentiometer 41 whose wiper is connected likewise through a resistor 42 and a large isolation capacitor 43 to the base electrode of the amplifier 39. The constants $c_1$ and $c_2$ may optionally be adjusted with the aid of the wipers on the potentiometers 36 and 41, so that the condition $c_1x^2 - c_2y^2 = 0$ on the diagonals of the screen can be satisfied. The two signals are amplified as a sum signal in the amplifier 39 and are subsequently applied to a push-pull output stage which comprises the complementary pair of transistors 43" and 44 which are connected to a supply voltage of +30 Volts. The interconnected emitters of the transistors 43" and 44 are connected to the terminal 6, while the terminal 7 is connected to earth through a current feedback resistor 48. The series arrangement of the four windings 20, 21, 22 and 23 is arranged between the terminals 6 and 7. Since the same current flows through the four windings in this case, their winding sense, as shown in FIG. 4, should be such that the lines of force have a variation as is shown in this Figure. This means that windings 21 and 22 must be wound in the same sense, but windings 20 and 23 must be wound in the opposite sense on the core 24.

Unlike the afore-described pure series arrangement of the four windings 20, 21, 22 and 23 it is possible to use a series-parallel arrangement in which 21 and 22 are arranged in series and 20 and 23 are arranged in series and in which these two series arrangements are subsequently arranged in parallel, taking into account the desired generation of the quadripolar field. It is of course alternatively possible to reverse the connecting terminals of the windings 21 and 22 in the pure series arrangement as shown in FIG. 11 relative to that of the windings 20 and 23 so as to obtain also a variation of the lines of force as is shown in FIGS. 4 and 5.

FIG. 11 likewise shows clearly that it is possible to use $c_1x^2 - c_2y^2$ because the parabola signal 35 is reversed relative to the parabola signal 40, because their extreme values are directed either positively or negatively. The two signals 35 and 40 are applied through capacitors 38 and 43 to clamping diodes 38' and 43' which clamp the extreme values of these parabola signals at earth potential. These clamped signals are subsequently applied to the base of transistor 39 whose DC-adjustment is ensured by means of a potentiometer comprising a variable resistor 45 and two resistors 46 and 47 of fixed value. The desired direct current can be adjusted by means of the resistor 45.

The feedback resistor 48 which is connected through resistor 47 to the base of transistor 39 provides for the desired linearity of the circuit arrangement. In this manner it is also achieved that the circuit arrangement as seen from the terminal 6 may be considered as a current source.

Furthermore the collector line of transistor 39 includes a resistor 49 which serves to ensure the desired drive of transistors 43" and 44. The series arrangement of a resistor 51 and a capacitor 50 is connected in parallel with the series arrangement of the windings 20, 21, 22 and 23. This series arrangement serves to avoid unwanted ringing phenomena in the circuit arrangement.

FIG. 11 furthermore shows that two sawtooth signals 52 and 53 of line frequency are applied with opposite polarity to the input terminal 17. If the wiper on potentiometer 54 is in the middle, no sawtooth signal is applied to the capacitor 38 through the isolation resistor 55 and consequently no sawtooth signal of line frequency is added the parabola 35. If the wiper on the potentiometer is moved in the direction of the terminal to which the signal 52 is applied, a sawtooth of the polarity of the signal 52 is added to the signal 35. However, if this wiper is moved to the terminal to which the signal 53 is applied, a signal of the polarity of the last-mentioned signal is added to the signal 35. As already described in the preamble these sawtooth signals serve to eliminate asymmetry between the coil halves 29 and 30 for the line deflection. These sawtooth voltages may also correct a possible slant position of the electron guns which must produce the electron beams R, G and B. If there is no question of asymmetry between the horizontal coil halves 29 and 30 and if the guns have no slanted position, wiper 54 may indeed be adjusted precisely in the middle.

The same applies to the sawtooth signals 56 and 57 of vertical frequency which are applied to the terminal 19. If the wiper on potentiometer 58 is adjusted exactly in the middle, no sawtooth signal can be added to the parabola signal 40 through the resistor 59. Dependent on the movement of this wiper, a signal of the polarity of the signal 56 or of the polarity of the signal 57 may be added to the parabola 40. The supply of the sawtooth signals 56 and 57 serves to eliminate asymmetries between the vertical coil halves 27 and 28 or also in this case to correct a possible slanted position of the guns. If the said asymmetries or slanted position of the guns is not present in this case, the wiper on potentiometer 58 may be placed in its central position. If there are two pairs of four windings each, the circuit arrangement according to FIG. 11 is to be split up in two parts. The first part then supplies parabola and/or possibly sawtooth currents of line frequency to the first pair of four windings, the other part supplies parabola currents and possibly sawtooth currents of field frequency to the second pair of four windings.

FIG. 12 shows a circuit arrangement for the case where generator 5 must generate currents in accordance with the equation $c_1'x^2 + c_2'y^2$, that is to say, for the elimination of errors described with reference to FIG. 10. Then the two parabola currents must have the same polarity. This follows from FIG. 12 in which the minimum of the field frequency parabola 40' points in the same direction as the line frequency parabola 35. The coefficients $c_1'$ and $c_2'$ may be adjusted with the wipers on potentiometers 36 and 41, respectively. The circuit arrangement according to FIG. 12 is a so-called magnetic clamping circuit which is extensively described in the U.S. patent application Ser. No. 43,369, filed June 4, 1970. In this case it is only stated that the terminal 6 is not DC coupled, but is coupled through an isolation capacitor 60 to the emitters of the transistors 43" and 44. The required clamping is obtained by means of an additional winding 61 which is also wound on the core 24. The mean current of the pulsatory current flowing through the transistor 43" exclusively flows through the winding 61 because coil 61 is shunted by a capacitor 62 which has a high value for field and line frequencies. Since the correct ratio to be chosen between the number of turns on the winding 61 and the overall number of turns of the four windings 20 to 23, a homogeneous field induced from winding 61 may be added to the alternating field induced from the windings 20 to 23 in the core 24, the extreme values of the parabolas being adjusted at the zero level exactly in the middle of the scan period.

The great advantage of the magnetic clamping circuit according to FIG. 12 is that clamping of the extreme value of the applied signal is exclusively dependent on the shape (in this case the parabola shape) of these signals and not on their amplitude or frequency. In the Example according to FIG. 12, the supply of the sawtooth signals 52, 53 and 56, 57 as shown in FIG. 11 is not shown. If in the Example according to FIG. 12 this is desired, the supply of these sawtooth signals may take place in a similar manner as in the circuit arrangement according to FIG. 11.

What is claimed is:

1. A circuit for a color television display tube, said circuit comprising first and second deflection coil units adapted to receive respective deflection currents, each unit having two symmetrical coil halves which are arranged opposite to each other and defining a pair of places therebetween wherein said windings have at least a reduced winding density, the first unit being disposed 90° in the tangential direction relative to the second unit, said units being disposed around the neck of the cathode-ray tube for deflecting at least one electron beam generated in the cathode-ray tube into two orthogonal directions when the respective deflection current flows through each coil unit; means for correcting distortion including at least four windings disposed tangentially relative to one another at an angle of approximately 90° near said places respectively, switching means coupled to said windings for applying a correction current through the four windings, means coupled to said switching means for generating said correction current in accordance with the deflection current flowing through at least the first deflection coil unit, whereby the windings generate a quadripolar field which is in accordance with said deflection current at the area of the deflection plane of the electron beam.

2. A circuit as claimed in claim 1, wherein said units further comprise a core, said four windings comprising toroid coils wound on the core.

3. A circuit as claimed in claim 1, wherein said tube has three beams located on the vertices of an equilateral triangle at the area of the deflection plane, and wherein said correction current comprises the difference between a current which is substantially proportional to the square of the current flowing through the first deflection coil unit and a current which is substantially proportional to the square of the current flowing through the second deflection coil unit said difference being substantially zero for those instantaneous values of the two deflection currents at which the three beams are located on the diagonals of the tube display screen.

4. A circuit as claimed in claim 1 wherein said tube has at least one coplanar disposed beams and said correction current comprises the sum of a current which is substantially proportional to the square of the current flowing through the first deflection coil unit and a current which is substantially proportional to the square of the current flowing through the second deflection coil unit in accordance with the equation $$(c_1 - C_3)x^2 + (c_2 + c_4)Y^2.$$

in which the constants $C_3$ and $c_4$ are chosen to satisfy the equation $$c_4Y^2 - c_3x^2 = 0$$

along the diagonals of the screen, while furthermore $$c_i - c_3 \geq 0.$$

5. A circuit as claimed in claim 1 wherein the four windings are coupled in series and said switching means for supplying the correction current comprises a mixer circuit having an input adapted to receive a parabola signal of the frequency of the current flowing through at least one of the deflection coil units, and an output coupled to said windings.

6. A circuit as claimed in claim 5 wherein said input is adpated to receive a parabola signal of the frequency of the current flowing through the remaining deflection coil unit.

7. A circuit as claimed in claim 5, further comprising means for the elimination of asymmetries including means for applying a polarity reversible sawtooth signal of the frequency of the deflection current flowing through at least one of the deflection units to the mixer circuit input.

8. A circuit as claimed in claim 7 further comprising means for applying a polarity reversible sawtooth signal of the frequency of the deflection current flowing through the remaining deflection unit to the mixer input.

9. A system of deflection coils for use in a circuit that eliminates distortion comprising a core, and a first and a second deflection coil unit, each unit having two symmetrical coil halves which are arranged opposite to one another, the first unit being disposed 90° in the tangential direction relative to the second unit, and defining a pair of places therebetween wherein said windings having at least a reduced winding density and also defining two positions where electron beam deflection directions cross said core four toroid windings disposed on the core at said positions tangentially relative to one another at an angle of approximately 90°, the two toroid windings located opposite to each other are situated near the two places between the symmetrical coil halves of one of the two deflection coil units.

10. An in-line gun type color television picture tube apparatus comprising:
a. an in-line gun type color cathode-ray tube in which three electron guns are arranged in a line along a first axis and the spots of electron beams from these electron guns appear along the first axis on the screen of the cathode-ray tube and are converged at the center of the screen,
b. a deflection yoke which deflects and scans the electron beams so that both side spots of the three electron beams appear on the screen at an equal distance on both sides of the center spot when the three electron beams are not converged,
c. a convergence magnetic field generating means, said convergence magnetic field generating means consisting essentially of at least one pair of convergence windings which are respectively provided externally on the neck of said cathode-ray tube and are opposite from each other in reference to the axis of the cathode-ray tube and a convergence power supply which supplies the convergence current to said windings which forms said convergence magnetic field generating means forming a convergence magnetic field which shifts only said side electron beams and has a field distribution which is symetrical and linear in reference to a second and third axis, said second and third axes being positioned 90° with respect to each other and 45° with respect to said first axis, the plane formed by said second and third axes being perpendicular to the axis of the cathode-ray tube, wherein both side electron beams are symmetrically shifted in reference to the center electron beam, as a function of the deflection angle, in order to complete convergence of the beam spot trio through said convergence magnetic field.

11. An apparatus according to claim 10, wherein a deflection yoke deflects and scans the electron beams so that the distances between side spots and center spots appearing at two symmetrical positions in reference to the center of the screen are equal when three electron beams are not converged.

12. An apparatus according to claim 10, wherein said convergence magnetic field generating means is positioned such that the convergence magnetic field is induced at the deflecting position of the deflection yoke to shift symmetrically both side electron beams in reference to the center electron beam at the center of deflection.

13. An apparatus according to claim 10, wherein said at least one pair of convergence windings comprises two sets of said convergence windings arranged at positions at 90° from each other around the axis of said cathode-ray tube.

14. An apparatus according to claim 10, wherein said convergence windings are toroidally wound on a core made of a ring-shaped highly magnetic material which surrounds the neck of said cathode-ray tube about the axis of said cathode-ray tube.

15. An apparatus according to claim 14, wherein said deflection yoke is comprised of a ring-shaped yoke core surrounding the neck of the cathode-ray tube and a pair of coils which are opposed to each other and mounted on said yoke core, and wherein said yoke core is employed as the core for said convergence windings.

* * * * *